Patented Dec. 8, 1953

2,662,095

UNITED STATES PATENT OFFICE 2,662,095

DIMETHYL-PHOSPHORIC ACID AMIDE AND ITS PRODUCTION

Robert M. Isham, Okmulgee, Okla., assignor, by mesne assignments, to Southern Production Company, Inc., Shreveport, La., a corporation of Delaware No Drawing. Application July 9, 1948, Serial No. 37,964

18 Claims. (Cl. 260—551)

This invention relates to the production of phosphoric acid amides such as the N-dialkyl derivatives of phosphoric acid amides and more particularly to the production of the novel compound N-dimethyl phosphoric acid amide.

The dialkyl phosphoric acid amides are technologically valuable compounds. For example, as has been explained in co-pending application of Morris Levine and Robert M. Isham, Serial No. 623,452, filed October 19, 1945, now U. S. Patent 2,623,611, the amide derivatives of the oxy acids of phosphorus serve excellently as selective solvents for acetylene.

A major object of the invention is to devise a process for producing N-dialkyl derivatives of phosphoric acid amides which utilizes readily available starting material, insures very high yields of the desired products with commensurately small quantities of undesired side products and which may be subsequently purified by a simple technique. A collateral object of salient importance is to produce, as a novel, technically available chemical, the compound N-dimethyl phosphoric acid amide. A further object of the invention is to devise an effective and economical method of recovering trimethyl amine in substantially pure condition from an admixture with homologues such as dimethyl amine. These and other equally important and related objects will become clarified as the novel procedure and its inherent advantages are amplified hereinafter.

Considered in a general sense, the improved synthesis of the N-dialkyl phosphoric acid amides involves the reaction of phosphorous oxychloride, or equivalent reactant, with the corresponding dialkyl amine to produce the dialkyl phosphoric acid amide and the dialkyl amine hydrochloride in accordance with the following simplified equation:

(1) $POCl_3 + 6(CH_3)_2NH \rightarrow$
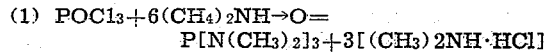
$P[N(CH_3)_2]_3 + 3[(CH_3)_2NH \cdot HCl]$ The two end products are separated in a manner to be described, and the amine may be regenerated from the hydrochloride and reused in the process.

The simplicity of the process, as above outlined, is more apparent than real, for as will be explained, the successful operation involved the preliminary appreciation and solution of specific problems and the correlation of these findings into the novel combination entity. These problems for the major part were unappreciated and unsolved by prior workers in this field.

It is known that phosphorus oxychloride reacts violently with amines. For this reason, this type of reaction is generally carried out in the presence of a diluent. In the present synthesis, the diluent employed subserves a number of functions and this multiple purpose establishes difficultly attainable criteria of operability and efficiency. While these will be discussed more in detail in describing the actual operation of the process, it may be noted initially that such diluent must not only be a solvent for the reactant, the dialkyl amines, but it should also be a solvent for the phosphoric acid amide which is formed. To insure facile and effective separation of the end products, such diluent must also be essentially a non solvent for the amine hydrochloride. Furthermore, it must be readily and quantitatively separable by simple means from its solute, i. e., the formed amide. If the diluent is a solvent for the amide and is a nonsolvent for the amine hydrochloride, then the latter, being a crystalline solid, may be separated from the reaction mixture by any suitable liquid-solids separation method such as decantation, filtering, centrifuging or the like. After such preliminary separation of the solid hydrochloride from the solution, the latter is then treated to evolve the solvent and recover the desired end product, namely, the amide. This may be simply done by subjecting the solution to a distillation step to evolve the diluent. The recovered amide may be redistilled or otherwise treated to insure the desired degree of purity.

The separated amine hydrochloride can be utilized again in the process by regenerating the amine therefrom and recycling the latter to the primary reaction zone in admixture with a fresh charge of the dialkyl amine. This may be accomplished by a number of methods as, for example, by treating the hydrochloride with an aqueous solution of caustic soda followed by heating to evolve the amine.

The novel method of the invention for producing N-dimethyl phosphoric acid amide is to be carefully distinguished from earlier proposed treatments which might appear, superficially, to be analogous, such as is described by Michaelis (Annalen der Chemie, vol. 326, p. 169 et seq.) for the preparation of N-diethyl phosphoric acid amide. The only method described in this article involved the reaction of the mono-amide dichloride derivative with an excess of the secondary amine. This investigator did not report on and evidently was not concerned with the synthesis of the dimethyl phosphoric acid amide for he describes only the ethyl and propyl compounds.

It has been ascertained that if the Michaelis method is followed using the dimethyl amine as a starting material, no yield of the desired product is obtained. This is because of the extreme solubility of the dimethyl phosphoric acid amide in water. This property is unexpected and not to be inferred from any a priori considerations derived from Michaelis since this author points out (Annalen der Chemie, vol. 326, p. 199) that the higher N-alkyl phosphoric amides such as N-diethyl phosphoric amide can be separated from its aqueous solution by means of ether. The applicant has found that the lower homologue, N-dimethyl phosphoric acid amide, cannot be thus separated. Michaelis recommended the use of diethyl ether as the diluent in the synthesis. Substitution of di-isopropyl ether also has been found to be undesirable in the production of N-dimethyl phosphoric acid amide because its use always leads to an impure and contaminated product due to the relatively high solubility of dimethyl amine hydrochloride in the ether and the relatively high rate of sublimation of the hydrochloride under the conditions under which the N-dimethyl phosphoric acid amide is recovered from the reaction mixture. It was only with extreme difficulty that the product was freed from this amine hydrochloride. It is thus apparent that Michaelis did not appreciate or disclose the peculiar specificity of either dimethyl phosphoric acid amide or the dimethyl amine hydrochloride with respect to the diluent.

Michaelis points out that not only do secondary amines react with phosphorus oxychloride to give N-dialkyl phosphoric acid amides in accordance with Equation I, but primary amines similarly react with the oxychloride according to the following equation:

(2) 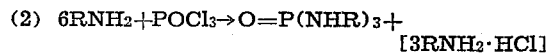

$6RNH_2 + POCl_3 \rightarrow O=P(NHR)_3 + [3RNH_2 \cdot HCl]$

This fact is of paramount importance in the preparation of dimethyl phosphoric amide for the reason that whereas the dimethyl derivative may readily be purified by distillation under reduced pressure, the monomethyl phosphoric acid amide obtained from the monomethyl amine does not lend itself to such separation by distillation even at pressures as low as 1 mm.; on the contrary, it decomposes with elimination of monomethyl amine and the formation of a non-volatile residue.

The commercially available dimethyl amine almost invariably contains some monomethyl amine and hence this differentiation becomes of salient importance. Inasmuch as both monomethyl amine and dimethyl amine react with phosphorus oxychloride, the reaction of a mixture of the amines with such reagent would result in a mixture of the corresponding acid amides. Now it would be assumed that, since N-dimethyl phosphoric acid amide can be recovered by distillation under reduced pressures, as differentiated from the action of the corresponding N-monomethyl compound, a mixture of the two alkylated phosphoric acid amides should be amenable to separation by distillation under reduced pressure, the N-dimethyl phosphoric acid amide passing overhead and the monoalkyl analogue remaining as a residue. It was definitely ascertained as a result of a number of tests that this was not the case. On the contrary, and unexpectedly, it was found that when the dimethyl amine is mixed with even a small quantity of monomethyl amine and is reacted with phosphorus oxychloride, the yield of N-dimethyl phosphoric acid amide was inordinately reduced. But small quantities of the monomethyl amine reduces the yield considerably; larger quantities of the monomethyl amine reduces the yield still more until substantially no distillable product at all is obtained when the two amines are present in equal molecular proportions in the reaction mixture.

This is a finding which is quite unexpected and profoundly important when, as noted above, it is remembered that the commercially available dimethyl amine practically always contains some monomethyl amine. As a result of extensive investigation of this inhibitive effect of the monomethyl amine, it has been determined that if the dimethyl amine used as the starting material for the described synthesis contains more than about 1% of monomethyl amine, it should be subjected to a preliminary purification to remove all or at least the greater portion of the contained monomethyl homologue. This can readily be achieved by suitable methods such as fractional distillation.

There are a number of other features which impart a rather critical character to this synthesis. If, for example, the phosphorus oxychloride is added in excess of 1/6 of the molar quantity of dimethyl amine plus monomethyl amine, the resultant product obtained is impure and is contaminated with partially chlorinated products of the type dichloro-dimethyl phosphoric acid amide. Such partially chlorinated products have a deleterious effect particularly on the stability of the dimethyl phosphoric acid amide because not only does the product darken very quickly even after purification by distillation, but it also becomes quite corrosive to metals. It was ascertained that for best results, the dialkyl amine should be present slightly in excess of the six mols required. It was determined as a result of extensive investigation that optimum molar ratio between the phosphorus oxychloride and the dimethyl amine is from 1:6.2 to 1:8 and preferably between 1:6.2 and 1:7. The excess amine does not represent a loss in the reaction for, as will be described later, it may be separately recovered and recycled in the process.

The temperature similarly is a very important factor in the process. If the temperature is either too low or too high, the yield is quite seriously diminished. It is interesting to observe that if the temperature of the system is too low during the addition of the phosphorus oxychloride to the amine, the bad effect cannot be overcome by subsequent application of heat. The temperatures should be maintained within the range of 32° F. to 240° F. and preferably between about 60° F. and 200° F.

The time factor of the reaction likewise is important. The reaction between phosphorus oxychloride and amines is quite violent even in the presence of a diluent, hence, care should be exercised in the addition of one reactant to the other. Even with such vigorous reaction, nevertheless, sufficient time must be allowed to permit the oxychloride to react completely. Such complete reaction is of extreme importance not only because of the desirability of achieving optimum yields but more importantly because incomplete reaction results in contamination of the desired product with the undesired partially chlorinated materials discussed hereinbefore. It has been determined that after the addition of all the phosphorus oxychloride to the amines, or vice versa, a period of about two hours, at a temperature of 200° F. should be allowed to complete the reaction.

As noted above, in effecting the reaction the amine solution may be added to the phosphorus oxychloride solution or the oxychloride solution may be added to the amine solution. The latter method is preferable because with such technique the amine is present in large excess during a greater part of the reaction which favors the complete reaction of the oxychloride.

The diluent which is employed, as noted previously, is of major importance if high yields are to be achieved. In addition to the criteria set forth above, the diluent should also present these additional characteristics or properties: it must be inert toward both phosphorus oxychloride and amines; it should have a boiling point or boiling range between about 100° F. and 390° F. and preferably between 250° F. and 300° F.; it must remain a mobile liquid at 60° F. and be perfectly stable at its boiling point; it must be a solvent for phosphorus oxychloride, amines, and for N-dimethyl phosphoric acid amide while being substantially a non-solvent for amine hydrochloride; it must have the ability to wet mono and dimethylamine hydrochloride even when these have absorbed some water; finally, the solvent must be substantially non-hygroscopic.

Therefore, to be fully effective, the diluent should be slightly hydrophyllic. i. e., it should be able to dissolve small but noticeable quantities of water. These criteria, as will be appreciated, are difficult to attain in a particular diluent. Thus toluene presents most of the desired properties to a satisfactory degree but does not dissolve water. It has been ascertained by actual tests that toluene will not wet amine hydrochloride which has absorbed a slight amount of water and very poor yields have been secured whenever toluene was utilized as the diluent. Similarly, normal heptane and 2,2,4 trimethyl petane were found to be as unsuitable as toluene.

It would be expected that dioxane would be suitable for use as a diluent in the reaction. This is miscible with water and wets amine hydrochloride which has absorbed some water; however, in spite of this but poor yields were obtained when this diluent was employed. Diethyl cellosolve, similarly, does not insure good yields when employed as the diluent.

It has been determined that the hydrophyllic character of the diluent is of great if not critical importance in establishing the utility of the diluent in the refined reaction. Substances which have been found to be effective diluents are those which possess the properties set forth above and which are able to absorb from about 0.1 to 3% by weight of water. Within this category are ethers having boiling points between 150° F. and 390° F.

The effective solution of the problems inherent in the production of dialkyl derivatives of phosphoric acid amides will more clearly be appreciated and the value of the described improvements appraised by consideration of a typical illustrative embodiment which invokes the principles set forth.

A solution of 2950 cc. of dimethyl amine in 4500 cc. of dibutyl ether was introduced into a suitable pressure vessel equipped with a motor driven stirrer. While this solution was agitated, there was added 1000 cc. of a solution containing 568 cc. of phosphorus oxychloride in dibutyl ether gradually over a 30 minute period. The temperature was then raised to 200° F. and maintained at this point for a period of 2 hours during which time the reaction mixture was continuously agitated. After this period, the reaction mass was cooled while agitation was maintained. The portion of the excess dimethyl amine that remained in the vapor state was vented to suitable storage.

The reaction product consisted chiefly of a dibutyl ether solution of N-dimethyl phosphoric acid amide, a relatively small quantity of dimethyl amine and material boiling above 90° C. at 3 mm. Hg, intimately mixed with solid dimethyl amine hydrochloride. This solid hydrochloride was then separated from the solution on a metal Buchner funnel under conditions controlled to prevent contact of air with the amine hydrochloride. The separated hydrochloride was washed several times with dibutyl ether and the wash solution was added to the original filtrate.

The filtrate was then introduced into a still having a stainless steel lining and this still was heated until all of the residual dimethyl amine present was separated and recovered. The still was then subjected to a moderate vacuum and heating was continued until substantially all of the dibutyl ether was recovered as distillate. The content of the still was transferred to a smaller still and the last traces of the ether were distilled at a pressure of about 10 mm. Hg. The pressure was then lowered to about 3 mm. and heating was continued whereupon 985 cc. of N-dimethyl phosphoric acid amide was recovered as a distillate. This was a colorless, limpid liquid having a slight amine-like order. About 65 cc. of a viscous residue was recovered from the still; this consisted of a phosphorus-containing difficultly hydrolizable nitrogenous compound.

As will be seen, the desired compound, N-dimethyl phosphoric acid amide was obtained in a yield of 92.6% of theoretical, based on the phosphorus oxychloride. Analysis established that the compound was free of any chloride ion, thus proving that the compound was free of both amine hydrochloride and dichlorophosphoric acid amide.

Analysis also established that substantially one half of the amine entering reaction with phosphorus oxychloride was recovered as the amine hydrochloride. This recovered dimethylamine hydrochloride was washed free from acid amide, dissolved in about 4000 cc. of water and was transferred to a still equipped with a 10 foot packed column. A solution of 850 g. of sodium hydroxide in 4250 cc. of water was introduced and the still was heated. The distillation was carried out under a pressure of 40 p. s. i. and 1250 cc. of pure dimethyl amine was recovered. This amount added to the amine recovered from the reactor and from the still ahead of the diluent gave a total recovery of 1640 cc. This, as will be seen, constituted a recovery of 97.5% of all of the dimethyl amine added to the reactor which was not obtained in the form of N-dimethyl phosphoric acid amide. This practically quantitative recovery of product establishes the process as most highly efficient.

An operation was carried out similar in all respects to that previously described except that isopropyl ether was employed as the diluent in lieu of the dibutyl ether and the acid amide was recovered in substantially the same yield. In this operation, however, the isopropyl ether had taken up considerable quantities of the amine hydrochloride, a portion of which sublimed and contaminated the acide amide end product. This rendered the product impure and less stable than that obtained when using the dibutyl ether as the diluent.

It has been found in the course of the investigations on the new process herein described, that even if monomethyl amine is present in the original reaction mixture, the amine regenerated from the amine hydrochloride is free from the primary amine.

It will be apparent that a number of permissive modifications of the described process may be utilized. For example, the initial reaction product may be agitated and gently heated with the stoichiometrical quantity of 10 N sodium hydroxide to decompose the amine hydrochloride in situ. By employing a refrigerated reflux, the liberated amine together with the excess amine which did not enter the reaction may thus be recovered by distillation in the usual way to obtain between 99 and 100 per cent. of the unreacted amine.

After all of the amine has been withdrawn in this manner, the still may then be heated to a high temperature to remove all of the water by azeotropic distillation. This may be carried out effectively by a separator or decanter being connected to the outlet of the condenser to stratify and separate the water which accompanied the diluent in the distillate. The diluent now freed of water may be continuously returned to the reactor which at this stage functions as a still. After all of the water has been removed from the reaction mixture by this method, conditions may then be adjusted to distill off and recover the diluent. The undistilled product in the reactor may then be transferred to a smaller still and distilled under a vacuum of about 3 mm. as previously described to obtain the desired dimethyl phosphoric acid amide as a substantially pure distillate. In this operation, the sodium chloride, formed in the regeneration of the amine from the amine hydrochloride remains as a solid cake in the first still.

A major advantage of the second method using the reactor for a dual purpose as compared to the first described procedure is that it avoids the transfer of material from reactor to filter and from filter to still and eliminates the necessity for a filter, thus achieving a saving in both equipment and time. Another notable advantage of the second method is that it eliminates the necessity of protecting the formed amine hydrochloride from moisture. This second method, however, does require a very strict control of the quantity of alkali added and an assurance of complete reaction of the alkali with the amine hydrochloride. Thus if even a small quantity of free alkali be present, either as a result of the addition of an excess over the stoichiometrical quantity or of failure of some of the alkali to react, some of the acid amide would be decomposed when the mixture is heated to drive off the amine, water and diluent, thus diminishing the yield of the desired product.

In the first example given, in which a yield of 92.6% of the theoretical amount of N-dimethyl phosphoric acid amide was recovered, the dimethyl amine employed in the reaction was recovered by regeneration from dimethyl amine hydrochloride produced in a previous operation. This, as has already been stated and as will be more apparent later, was free from any monomethyl amine.

As explained previously, the commercial dimethyl amine practically always contains some monomethyl amine, and may also contain trimethyl amine; typical commercially available material usually contains about 3% of the trimethyl and about 1% of the monomethyl amine. When the process, as previously described, is carried out using such commercial dimethyl amine, the yield of the phosphoric acid amide is only about 85% of theoretical. It was ascertained, as will be explained more fully, that the presence of the trimethyl amine has no practical effect on the yield and hence the monomethyl amine even in the stated small amounts has a marked inhibitory effect. A series of tests were conducted to determine the effect of varying amounts of monomethyl amine on the yield of the amide. It was found that when the dimethyl amine entering the reaction contained about 8% to 10% of the monomethyl amine, the yield diminished greatly, reducing the recovery to only about 40% of theoretical. Similarly, with increasing amounts of the monomethyl contaminant in the reaction mixture, a commensurate reduction in yield occurred until when equimolar quantities of the monomethyl amine is present with the dimethyl amine no N-dimethyl phosphoric acid amide whatever is produced, as recoverable product.

While no precise explanation of the mechanism of the marked inhibitory or retarding effect of the monomethyl amine is offered, it appears probable that mixed phosphoric and amides of the following type

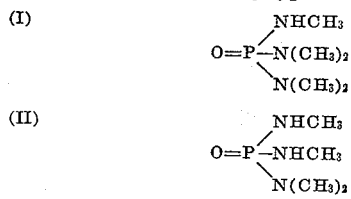

are formed in addition to the tri-monomethyl compounds. Heating of any of these three monomethyl derivatives will result in condensed compounds which are non-distillable. Assuming such a postulate, if all of the monomethyl amine which is admixed with the dimethyl amine would react with phosphorus oxychloride to yield a compound of type I, above, then the yield of the desired compound would be reduced by an amount equivalent to three times the original concentration of the monomethyl amine. Similarly, the formation of the mixed amide of type II would reduce the yield 1.5 times as much as the monomethyl amine entering into the synthesis of this type II compound. It will be observed that the fact that no distillable product was recovered when an equimolecular mixture of monomethyl amine and dimethyl amine was permitted to react with phosphorus oxychloride would indicate that at least some portion of the monomethyl amine was converted to the mixed amide of type I because if it were all converted to the type II compound, a portion of the dimethyl amine equal to 50% of that originally present should have been recovered in the desired compound. But as explained, not any distillable product is obtained when such equimolecular mixtures are used. It can thus be appreciated that the reduction in yield effected by the monomethyl amine is far greater than that which would be expectable on the basis of its concentration. When the amines are present in excess, as is the case in the preferred operation, this inhibitory effect is accentuated.

There is also another way in which the presence of monomethyl amine would tend to reduce the yield of the desired dialkyl phosphoric acid amide. This results from the fact that the dimethyl amine is a stronger base than the monomethyl amine. Now the initial or immediate products which are formed when phosphorus oxychloride reacts with primary or secondary amines are phosphoric acid amide and hydrogen chloride. Immediately upon its formation, the hydrogen chloride is neutralized by reaction with amine. But, whether the evanescently present hydrogen chloride was produced from a reaction involving the primary or secondary amine, it will be preferentially neutralized with the secondary amine because this latter is the stronger base. Such neutralization thus removes or abstracts secondary amine from potential reaction with the phosphorus oxychloride and leaves a residue of amines in which the undesirable primary amine is in correspondingly greater concentration than in the original mixture.

It is thus apparent that a major prerequisite to securing high yields of N-dimethyl phosphoric acid amide is the substantially complete absence of monomethyl amine in the reaction mixture.

While the presence of monomethyl amine in the reaction mixture is highly detrimental for the reasons explained, the presence of trimethyl amine does not have any particular effect on the yield of the desired amide product. When a mixture of dimethyl amine and trimethyl amine is acted on by phosphorus oxychloride, apparently only the dimethyl amine reacts, since, upon completion of the reaction of the trimethyl amine can be substantially completely recovered by distillation.

In a further embodiment of the invention, this non-reactivity of trimethyl amine is utilized to effect economies in the operation and particularly in reducing the cost of the dimethyl amine used in the synthesis. As is known, dimethyl amine is ordinarily produced by the reaction of ammonia with methyl alcohol. The resulting reaction product comprises a complex mixture containing some water, mono-, di-, and trimethyl amines and varying quantities of unreacted alcohol and ammonia. The amines are readily separated from associated products by fractionation. The amines, however, are difficult to separate one from another, not only by reason the close proximity of their boiling points but also because dimethyl and trimethyl amines form azeotropic mixtures. The monomethyl amine can be separated by careful fractionation utilizing high reflux ratios. The preparation of substantially pure dimethyl amine is an arduous task involving such procedure as distillations under different pressures, treatment with solvents more selective to either dimethyl amine or trimethyl amine than to the other and extraction distillation. Such complex methods of separating the dimethyl from the trimethyl amine are, therefore, quite expensive.

Now, as will have been appreciated, when dimethyl amine is to be employed for the synthesis of N-dimethyl phosphoric acid amide, this costly separation of the contained trimethyl amine may be wholly or partially eliminated since the trimethyl amine has no untoward effects in the synthesis.

In carrying out the present invention, the aminator product was subjected to a suitable series of steps to separate water, methyl alcohol, an ammonia-trimethyl amine complex and monomethyl amine to recover a residual fraction comprising a mixture of dimethyl amine and trimethyl amine. This mixture was allowed to react with phosphorus oxychloride under the conditions previously described for the dimethyl amine alone, the quantity of the phosphorus oxychloride used, of course, being calculated only on the basis of the dimethyl amine present in the entering mixture. After completion of the reaction, the gas above the liquid phase in the reactor consisted of trimethyl amine admixed with the minor portion of unreacted excess dimethyl amine. This gaseous mixture, together with that obtained by subjecting the reaction product to the first stage of heating was recycled through the aminator to provide more dimethyl amine.

While such a method of utilizing mixtures of dimethyl and trimethyl amines did give satisfactory results, it is more advantageous to subject the mixture to a preliminary treatment to reduce the amount of the trimethyl amine. This may be accomplished readily by subjecting the mixture to a simple fractionation whereby a dimethyl amine-trimethyl amine azeotrope is recovered as overhead and a pure trimethyl amine is recovered as a bottom product. The overhead fraction thus recovered is charged to the reaction for reaction with the phosphorus oxychloride. By reducing the percentage of trimethyl amine in the charge material, several major advantages accrue. Because of the reduction in volume of the amine mixture, a smaller reactor may be employed while securing the same ultimate yield of the desired product. In addition, all of the dimethyl amine which does not react with the phosphorus oxychloride may be recovered and, if desired, reemployed in the synthesis. This is achieved by conducting the gases accumulating above the reaction mixture, together with those evolved by the first stages of heating, to the fractionation step previously described in which a fraction consisting of substantially pure trimethyl amine is separated from an azeotropic mixture of dimethyl and trimethyl amines. The separated mixture of the dimethyl and trimethyl amine preferably is recycled for further reaction with phosphorus oxychloride and the trimethyl amine fraction may, if desired, be recycled to the aminator.

It will be observed that the above described process constitutes an efficient and economical method of preparing trimethyl amine of high purity from mixtures of this with primary and/or secondary amines. This material constitutes an end product of individual technical value. Thus, while it has been pointed out that it may be recycled to the aminator, it may be found desirable to utilize all or a portion of this fraction for other purposes and as a reagent chemical in other synthesis. For example, it may be converted into the commercially important quaternary compounds which are of great technical value as surface active compounds, bactericidal agents and the like; such quaternary compounds may be prepared by methods known in the art.

When the pure tertiary amine is desired as an end product, the process described herein may be slightly modified. The phosphorus oxychloride may be added to the mixture of amines and diluent slightly in excess of ⅙ the total molar quantity of primary and secondary amines in the mixture, the reaction allowed to run to completion and the tertiary amine may be recovered in pure condition by subjecting the reaction mixture to distillation, as for example, at atmospheric pressure and utilizing refrigerated reflux. If the primary and secondary amines occur in small concentrations in the original mixture, the solution remaining after separation of the tertiary amine can be used directly in the purification of further quantities of tertiary amine subsequent to separation of amine hydrochloride. It is advisable, however, after several purifications, to separate the diluent from amine reaction products by distillation to recover the purified diluent as an overhead product.

While the preferred method of producing N-dimethyl phosphoric acid amide described herein involves the reaction of the dimethyl amine with a particular phosphoric acid derivative, namely phosphorus oxychloride, it will be apparent that other phosphoric acid derivatives may be utilized such, for example, as trialkyl phosphates, mixed ester amides of the type of $O=P(NR_2)(OR)_2$ or $O=P(NR_2)_2(OR)$, mixed chloramides of the type of $O=P(NR_2)Cl_2$ or mixed chloroesters of the type of $O=P(OR)Cl_2$. Similarly, trihalides of phosphoric acid other than phosphorus oxychloride may be utilized, as for example, phosphorus oxybromide, phosphorus oxybromodichloride and phosphorus oxychlorodibromide.

As noted previously, N-dimethyl phosphoric acid amide is a new compound of marked technical value being particularly efficacious as a highly specific solvent for acetylene. Its physical constants and general characteristics are such as to render it of wide potential utility in the solvent field. The compound boils at 80° C. at 3 mm. Hg; its density is 1.0295 at 60° F.; its viscosity is 4.1 centistokes at 60° F. Of additional technical importance is the fact that the compound is substantially inert to steel at temperatures up to about 360° F.

It will now have been appreciated that the novel methods described herein are as eminently useful as they are novel. Such methods, rendered efficacious by invoking the concepts of the invention and applying the novel findings herein disclosed, particularly with respect to the precaution of substantially completely eliminating monomethyl amine from the reaction system and employing diluents of the defined characteristics insures the production of the desired product in almost quantitative yields and in readily available commercial equipment. Of dual importance is the noval method whereby mixtures of dimethyl amine and trimethyl amine may be simply and effectively processed to produce not only the valuable product N-dimethyl phosphoric acid amide, but also a pure trimethyl amine for any desired utilization in the technological fields. Hence, while preferred modifications of the invention have been described, it is to be understood that these are given, not in an exclusive sense, but didactically to clearly illustrate the principles of the invention, the scope of which is limited only by the appended claims.

I claim:

1. The compound $O=P(N(CH_3)_2)_3$.

2. A method of producing N-dimethyl phosphoric acid amide which comprises reacting dimethyl amine with phosphorous oxychloride in the presence of a slightly hydrophyllic diluent comprising an ether which is a solvent for the said reactants and for N-dimethyl phosphoric acid amide and which wets but is a non solvent for amine hydrochloride which boils within the approximate range of 100° F. to 390° F., controlling the reaction conditions to effect the formation of N-dimethyl phosphoric acid amide and dimethyl amine hydrochloride and separating and recovering the reaction products.

3. A method in accordance with claim 2 in which the separated dimethyl amine hydrochloride is treated with alkali to regenerate dimethyl amine and recycling the regenerated amine for further reaction with phosphorus oxychloride.

4. A method of producing N-dimethyl phosphoric acid amide which comprises reacting dimethyl amine with phosphorus oxyhalide in the presence of a slightly hydrophyllic diluent comprising an ether which is a solvent for the said reactants and for N-dimethyl phosphoric acid amide, and which wets but does not dissolve dimethyl amine halide which boils within the approximate range of 100° F. to 390° F., controlling the reaction conditions to effect the formation of N-dimethyl phosphoric acid amide and the corresponding dimethyl amine halide, separating the diluent containing the said phosphoric acid amide from the dimethyl amine halide and recovering the phosphoric acid amide from the diluent.

5. A process in accordance with claim 4 in which the separated dimethyl amine halide is treated with alkali to regenerate dimethyl amine and recycling the regenerated amine to the reaction zone for further reaction.

6. A method of producing N-dimethyl phosphoric acid amide which comprises contacting a mixture of dimethyl amine and trimethyl amine with phosphorus oxyhalide in the presence of a slightly hydrophyllic diluent comprising an ether which dissolves the said amines, the phosphorus oxyhalide and N-dimethyl phosphoric acid amide and which wets but does not dissolve dimethyl amine halide which boils within the approximate range of 100° F. to 390° F., heating the reaction mixture at a temperature and for a period of time to effect the formation of N-dimethyl phosphoric acid amide and the corresponding dimethyl amine halide, separating the diluent from the insoluble amine halide and recovering the N-dimethyl phosphoric acid amide from the separated diluent.

7. A method in accordance with claim 6 in which the separated diluent is recycled to the reaction zone in admixture with additional quantities of dimethyl and trimethyl amine.

8. A method in accordance with claim 6 in which the separated solid dimethyl amine halide is treated with an aqueous alkali solution to regenerate the dimethyl amine and recycling the regenerated dimethyl amine to the reaction zone.

9. A method of producing N-dimethyl phosphoric acid amide which comprises reacting dimethyl amine, with phosphorus oxyhalide in the presence of a slightly hydrophyllic diluent comprising an ether which is inert under the conditions of the reaction and which dissolves N-dimethyl phosphoric acid amide, dimethyl amine and the phosphorus oxyhalide but does not dissolve dimethyl amine halide which boils within the approximate range of 100° F. to 390° F.; heating reaction mixture at a temperature and for a period of time sufficient to effect the formation of N-dimethyl phosphoric acid amide and the corresponding dimethyl amine halide; treating the solution with an aqueous solution of an alkali in an amount just sufficient to neutralize the dimethyl amine halide to thereby regenerate dimethyl amine, therefrom, separating the free dimethyl amine from the diluent solution and then treating the dimethyl amine denuded diluent solution to separate and recover the contained N-dimethyl phosphoric acid amide.

10. A method in accordance with claim 9 in which the liberated dimethyl amine and the amide-free diluent are recycled to the reaction zones.

11. A method of producing N-dimethyl phosphoric acid amide and substantially pure trimethyl amine which comprises fractionating a mixture containing mono-, di-, and trimethyl amine to separate the monomethyl amine from a fraction consisting of a binary mixture of dimethyl amine and trimethyl amine; fractionating the binary mixture to produce an overhead fraction comprised of a dimethyl amine-trimethyl amine azeotrope and a bottom fraction consisting of pure trimethyl amine; contacting the said overhead fraction with sufficient phosphorus oxychloride to react with the dimethyl amine and in the presence of a slightly hydrophyllic diluent comprising an ether which dissolves the amines, N-dimethyl phosphoric acid amide, but which does not dissolve dimethyl amine hydrochloride which boils within the approximate range of 100° F. to 390° F., heating the reaction mixture at a temperature and for a period of time sufficient to effect the formation of N-dimethyl phosphoric acid amide and dimethyl amine hydrochloride separating the diluent solution from the solid hydrochloride and recovering the N-dimethyl phosphoric acid amide from the diluent solution.

12. A method in accordance with claim 11 in which the separated solid amine hydrochloride is treated with an aqueous alkali solution to liberate the dimethyl amine and recycling the liberated amine to the reaction zone for further reaction therein.

13. A method of producing N-dimethyl phosphoric acid amide which comprises reacting dimethyl amine, with phosphorus oxychloride in the molar ratio of amine to oxychloride of between 1:6.2 to 1:8 in the presence of a non reactive slightly hydrophyllic diluent comprising an ether which dissolves the amine, oxychloride and the dimethyl phosphoric acid amide and which wets but does not dissolve moist dimethyl amine hydrochloride which boils within the approximate range of 100° F. to 390° F., heating the reaction mixture to a temperature of between 60° F. and 200° F. and for a time sufficient, at a given temperature, to allow the reaction to run to completion; separating the solid dimethyl amine hydrochloride from the diluent solution, distilling off the diluent and recovering as a residue N-dimethyl phosphoric acid amide.

14. A method in accordance with claim 13 in which the solvent is an ether boiling between 150° F. and 390° F. and is capable of absorbing between about 0.1% and 3% by weight of water.

15. A method in accordance with claim 13 in in which the diluent is dibutyl ether.

16. A method in accordance with claim 13 in which the reaction is carried out while continuously agitating the reaction mixture.

17. A method in accordance with claim 13 in which the molar ratio of dimethyl amine to phosphorus oxychloride is between 1:6.2 and 1:7.

18. A method in accordance with claim 13 in which the separated solid dimethyl amine hydrochloride is neutralized with an aqueous solution of caustic soda to liberate dimethyl amine and recycling the liberated amine to the reaction zone for further reaction therein.

ROBERT M. ISHAM.

References Cited in the file of this patent
UNITED STATES PATENTS

| Number | Name | Date |
|---|---|---|
| 2,146,584 | Lipkin | Feb. 7, 1939 |
| 2,487,859 | Dickey et al. | Nov. 15, 1949 |

OTHER REFERENCES

Michaelis, "Ber deut. Chem.," vol 29 (1896). pp. 712–713.

Michaelis, "Liebigs Annalen," vol. 326 (1902), pp. 140, 141, 142, 172, 173, 179, 180, 181, 184, 185, 199, 200, 252, and 256.